United States Patent
Lee et al.

(10) Patent No.: US 7,509,860 B2
(45) Date of Patent: Mar. 31, 2009

(54) SYSTEM FOR MEASURING RESONANT FREQUENCY AND DELAY TIME OF QUARTZ CRYSTAL MICROBALANCE

(75) Inventors: Chao-Fa Lee, Taipei (TW); Tsong-Rong Yan, Taipei (TW); Cheng-Hsing Kuo, Taipei (TW)

(73) Assignee: Tatung Company, Taipei (TW)

( * ) Notice: Subject to any disclaimer, the term of this patent is extended or adjusted under 35 U.S.C. 154(b) by 75 days.

(21) Appl. No.: 11/783,943

(22) Filed: Apr. 13, 2007

(65) Prior Publication Data

US 2008/0184801 A1 Aug. 7, 2008

(30) Foreign Application Priority Data

Feb. 5, 2007 (TW) .............................. 96104045 A

(51) Int. Cl.
*G01H 13/00* (2006.01)
*G01N 29/02* (2006.01)
(52) U.S. Cl. .................. 73/579; 73/24.01; 73/24.06
(58) Field of Classification Search ............... 73/24.01, 73/24.04, 24.06, 23.35, 23.36, 23.4, 23.21, 73/1.37, 579, 580, 648
See application file for complete search history.

(56) References Cited

U.S. PATENT DOCUMENTS

| 4,640,134 | A | * | 2/1987 | Simmons | 73/648 |
| 5,235,844 | A | * | 8/1993 | Bonne et al. | 73/24.01 |
| 5,635,619 | A | * | 6/1997 | Udpa et al. | 73/1.82 |
| 6,161,420 | A | * | 12/2000 | Dilger et al. | 73/24.01 |
| 6,208,153 | B1 | * | 3/2001 | Flugan | 324/727 |
| 7,204,123 | B2 | * | 4/2007 | McMahan et al. | 73/1.37 |
| 2006/0260385 | A1 | * | 11/2006 | Galun et al. | 73/24.04 |

* cited by examiner

*Primary Examiner*—Helen C. Kwok
(74) *Attorney, Agent, or Firm*—Bacon & Thomas, PLLC

(57) ABSTRACT

This present invention relates to a system for measuring resonant frequency and delay time of the quartz crystal microbalance. The system includes a transistor oscillating circuit, a switch circuit, a comparator circuit, and a control circuit. The transistor oscillating circuit comprises a quartz oscillator for generating an original oscillating signal. The switch circuit is coupled to the transistor oscillating circuit for outputting a start signal to generate the original oscillating signal. The comparator circuit is coupled to the transistor oscillating circuit for transforming the original oscillating signal to a square wave oscillating signal. The control circuit is coupled to the comparator circuit for receiving the square oscillating signal to estimate the resonant frequency and the delay time of the quartz crystal microbalance.

17 Claims, 3 Drawing Sheets

SYSTEM FOR MEASURING RESONANT FREQUENCY AND DELAY TIME OF QUARTZ CRYSTAL MICROBALANCE

BACKGROUND OF THE INVENTION

1. Field of the Invention

This present invention relates to the technical field of quartz crystal microbalances and, more particularly, to a system for measuring resonant frequency and delay time of quartz crystal microbalance.

2. Description of Related Art

The quartz crystal microbalance (QCM), also known as an electronic nose, is generally used for measuring the micro substance. By pressing on the surface of a quartz crystal, some induction voltage will be generated on the surface of the quartz crystal. On the other hand, by providing voltage on the quartz crystal, the shape of the quartz crystal will be changed. The aforementioned reaction is so-called piezoelectric effect. The mass loading effect, published by the Sauerbrey in 1959, discussed about the reaction relation of the mass adsorbed on the surface of the quartz crystal and the quartz oscillating frequency. Therefore, the QCM generally uses to detect the variation of the oscillating frequency for determining whether the mass absorbed on the surface of the quartz crystal is changed or not. In addition, the QCM also can measure the absorbed level of the gas molecule generated by different absorbed materials for determining the type or the concentration of the gas. Therefore, the QCM generally applies to detect odor, gas, polluted material, or toxic gas. Especially, the development of QCM systems for use in fluids or with visco-elastic deposits has dramatically increased the interest towards this technique. Major advantages of the QCM technique used for liquid systems are that it allows a label-free detection of molecules. An example of the application areas of the QCM is shown on biotechnology field.

QCM composes of a quartz crystal and an oscillating circuit. The oscillating circuit is coupled to the quartz crystal for generating a resonant frequency of the quartz crystal. Because the surface mass loading variation of the quartz crystal is relatively small, the variation of the resonant frequency of the quartz crystal is also relatively small, therefore the resonant frequency and the surface mass loading should be measured more accurately. Thus, the conventional QCM cannot measure the variation of the resonant frequency accurately.

When the QCM begins to measure the oscillating signal, the amplitude of the oscillating signal generated by the quartz crystal will gradually increase to a predetermined value, and the frequency of the oscillating signal will also become stable. While the oscillating signal becomes stable, the conventional QCM begins to measure the frequency of the oscillating signal for counting variation of the oscillating signal and the mass cohered by the QCM.

In addition, the delay time will influence the character and the adsorption quantity of the material detected by the QCM, but the conventional QCM cannot measure the relation between the delay time and the material detected by the QCM. Therefore, it is desirable to provide a system for measuring resonant frequency and delay time of the quartz crystal microbalance to mitigate and/or obviate the aforementioned problems.

SUMMARY OF THE INVENTION

An object of the present invention is to provide a system for measuring resonant frequency and delay time of the quartz crystal microbalance. By using the system, this present invention can accurately measure the frequency of the oscillating signal for counting the variation of the resonant frequency so as to acquire the mass of the material cohered by the QCM.

Another object of the present invention is to provide a system for measuring resonant frequency and delay time of the quartz crystal microbalance for measuring. By using this system, this present invention can measure the delay time occurred before the amplitude and the frequency of the oscillating signal become stable for determining the mass and the adsorption quantity of the material detected by the QCM so as to solve the aforementioned question.

In accordance with one aspect of the present invention, there is provided a system for measuring resonant frequency and delay time of the quartz crystal microbalance. The system comprises a transistor oscillating circuit, a switch circuit, a comparator circuit, and a control circuit. The transistor oscillating circuit has a quartz oscillator for generating an original oscillating signal. The switch circuit is coupled to the transistor oscillating circuit and receives a start signal for enabling the transistor oscillating circuit to generate the original oscillating signal. The comparator circuit is coupled to the transistor oscillating circuit for converting the original oscillating signal to a square wave oscillating signal. The control circuit is coupled to the comparator circuit for receiving the square wave oscillating signal so as to determine the resonant frequency and the delay time of the quartz crystal microbalance.

DETAILED DESCRIPTION OF THE PREFERRED EMBODIMENT

Figure 1:
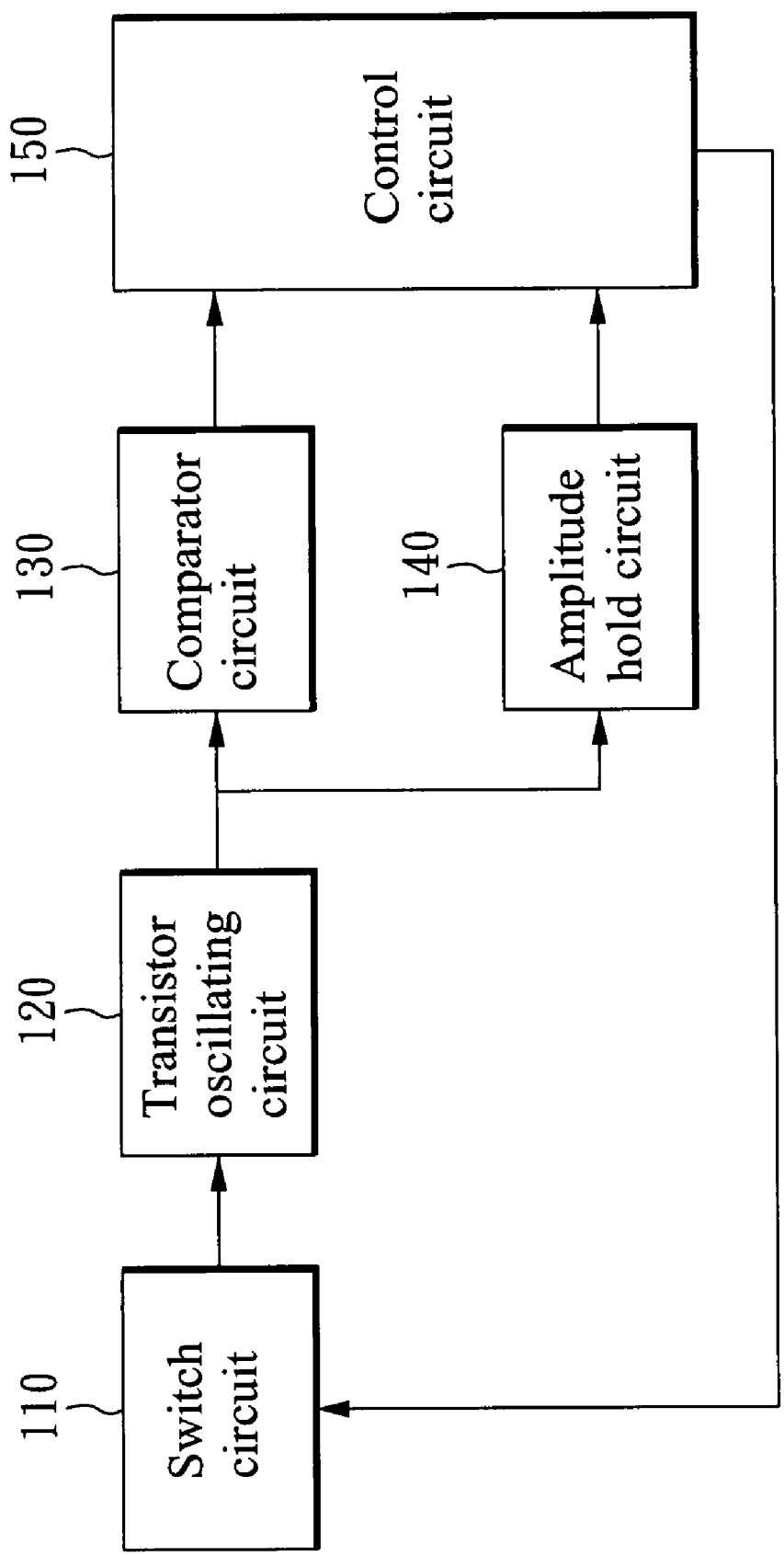
FIG. 1 is a block diagram of a system for measuring the resonant frequency and the delay time of the quartz crystal microbalance in accordance with the preferred embodiment of the present invention.

FIG. 1 is a block diagram of a system for measuring the resonant frequency and the delay time of the quartz crystal microbalance in accordance with the preferred embodiment of the present invention. This system comprises a switch circuit 110, a transistor oscillating circuit 120, a comparator circuit 130, an amplitude hold circuit 140, and a control circuit 150.

The transistor oscillating circuit 120 comprises a quartz oscillator 122 for generating an original oscillating signal. The switch circuit 110 is connected to the transistor oscillating circuit 120, while the switch circuit 110 receives a start signal, the transistor oscillating circuit 120 is enabled to generate the original oscillating signal.

The comparator circuit 130 is coupled to the transistor oscillating circuit 120 for converting the original oscillating signal to a square wave oscillating signal. The amplitude hold circuit 140 is coupled to the transistor oscillating circuit 120 and the control circuit 150 for receiving the original oscillating signal to output a hold maximum oscillating signal.

The control circuit is connected to the switch circuit 110, the comparator circuit 130, and the amplitude hold circuit 140 for receiving the square wave oscillating signal so as to estimate the resonant frequency and the delay time of the quartz crystal microbalance.

Figure 2:
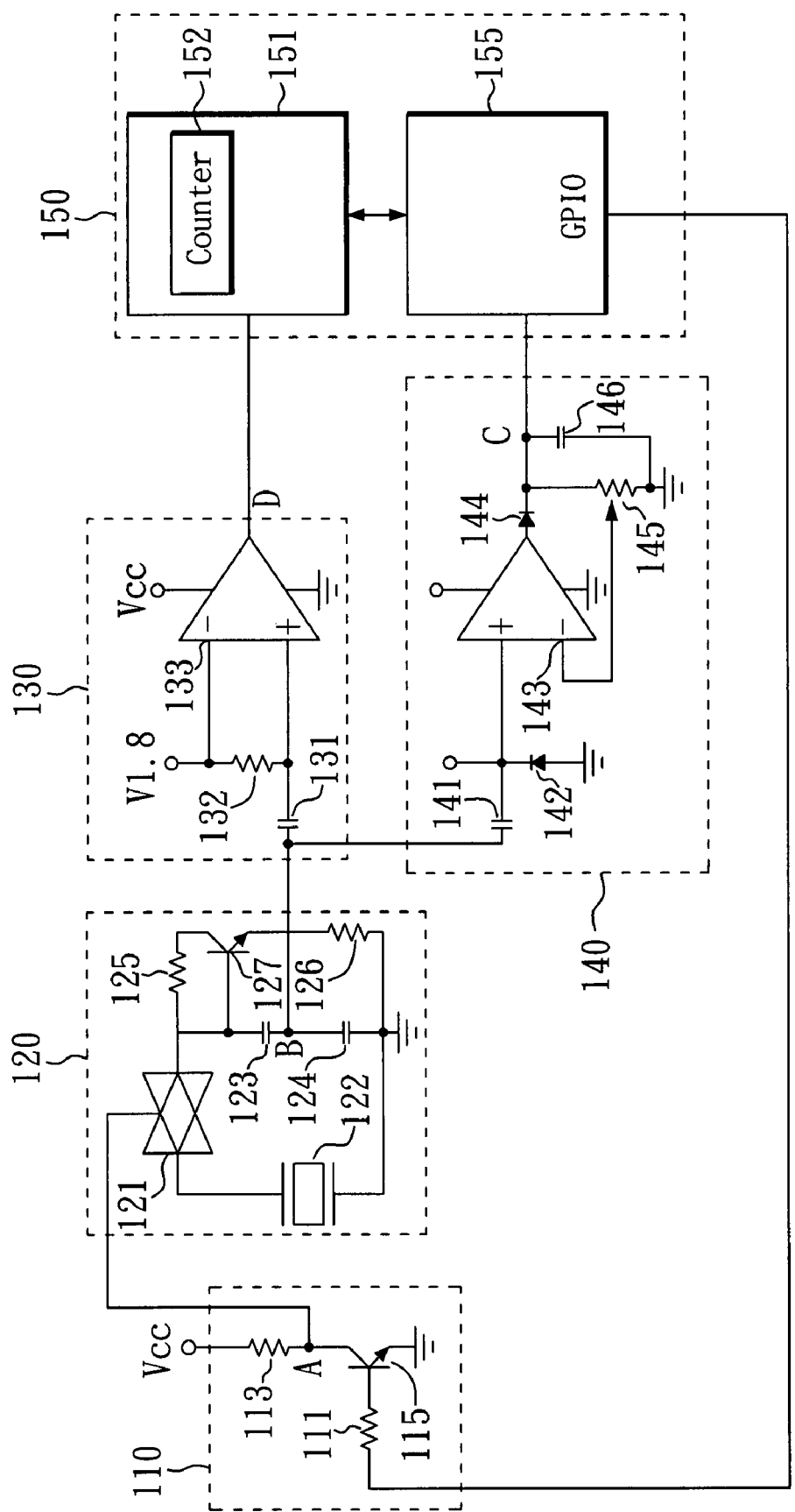
FIG. 2 is a circuit diagram of a system for measuring the resonant frequency and the delay time of the quartz crystal microbalance in accordance with the preferred embodiment of the present invention.

FIG. 2 is a circuit diagram of a system for measuring the resonant frequency and the delay time of the quartz crystal microbalance in accordance with the preferred embodiment of the present invention. The control circuit 150 comprises a frequency and the oscillating start signal detecting circuit 151 and a processor 155.

The switch circuit 110 comprises a first resistor 111, a second resistor 113 and a first transistor 115. One end of the first resistor 111 is connected to a pin of the processor 155 for receiving the start signal outputted by the processor 155, wherein the start signal is a high level signal and the pin of the processor is preferably a GPIO pin. The first transistor 115 is preferably a NPN transistor, and the base of the first transistor 115 is connected to the other end of the first resistor 111 for receiving the start signal. The emitter of the first transistor 115 is connected to a low voltage level, and the collector of the first transistor 115 is connected to an end of the second resistor 113. The other end of the second resistor 113 is connected to a high voltage level.

The transistor oscillating circuit 120 comprises a switch 121, a quartz oscillator 122, a first capacitor 123, a second capacitor 124, a third resistor 125, a fourth resistor 126 and a second transistor 127. The second transistor 127 is preferably a NPN transistor. The control end of the switch 121 is connected to the collector of the first transistor 115. One end of the quartz oscillator 122 is connected to the input end of the switch 121, and the other end of the quartz oscillator 122 is connected to a low voltage level. The output end of the switch 121 is connected to one end of the first capacitor 123, the base of the second transistor 127 and one end of the third resistor 125.

The other end of the first capacitor 123 is connected to one end of the second capacitor 124, and the other end of the second capacitor 124 is connected to a low voltage level. The collector of the second transistor 127 is connected to the other end of the third resistor 125, and the emitter of the second transistor 127 is connected to one end of the fourth resistor 126. The other end of the fourth resistor 126 is inserted at a low voltage level.

The comparator circuit comprises a third capacitor 131, a fifth resistor 132, and a first comparator 133. One end of the third capacitor 131 is connected to the first capacitor 123 and the second capacitor 124, and the other end of the third capacitor 131 is connected to the positive input end (+) of the first comparator 133. One end of the fifth resistor 132 is connected to a reference voltage (V1.8) and the negative input end (−) of the first comparator 133. The reference voltage (V1.8) is preferably 1.8 volts.

The amplitude hold circuit 140 comprises a fourth capacitor 141, a first transistor 142, a second comparator 143, a second diode 144, an adjustable resistor 146 and a fifth capacitor 145. One end of the fourth capacitor 141 is connected to the first capacitor 123 and the second capacitor 124, and the other end of the fourth capacitor 141 is connected to a positive end (+) of the second comparator 143. One end of the fifth capacitor 145 is connected to the negative end of the second diode 144, and the other end of the fifth capacitor 145 is connected to a low voltage level, and the mid end of the adjustable resistor 146 is connected to the negative input end (−) of the second comparator 143. Therefore, the amplitude hold circuit 140 forms a voltage follower.

The control circuit 150 comprises a frequency and oscillating start signal detecting circuit 151 and a processor 155. The frequency and oscillating start signal detecting circuit 151 is connected to the comparator circuit 130 for receiving the square wave oscillating signal to determine the resonant frequency of the quartz crystal microbalance so as to generate an oscillating beginning signal and a frequency value.

The frequency and oscillating start signal detecting circuit 151 comprises a counter 152 which is coupled to the comparator circuit 130 for counting the square wave outputted by the comparator circuit 130 to generate the frequency value. The frequency and oscillating start signal detecting circuit 151 can implement through a programmable logic element.

The processor 155 is coupled to the frequency and oscillating start signal detecting circuit 151 for determining the delaying time of the quartz crystal microbalance in accordance with the oscillating start signal. The negative end of the second diode 144 is connected to a pin of the processor 155. The pin of the processor 155 is connected to an analog-to-digital converter inside the processor 155 such that the processor 155 can obtain an amplitude of the original oscillating signal.

Figure 3:
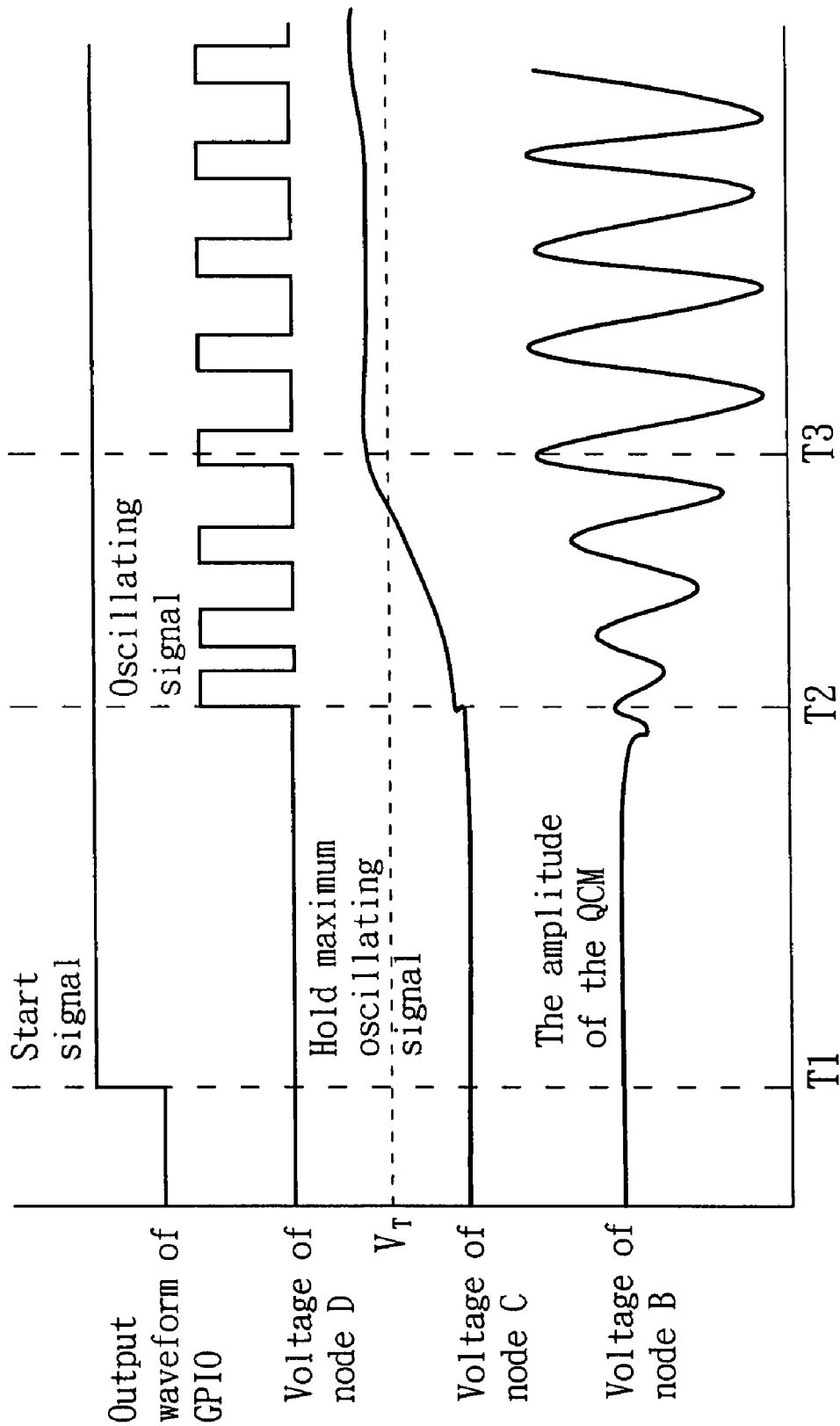
FIG. 3 is a schematic view of the resonant frequency and the delay time of the quartz crystal microbalance in accordance with the preferred embodiment of the present invention.

FIG. 3 is a schematic view of the resonant frequency and the delay time of the quartz crystal microbalance in accordance with the preferred embodiment of the present invention. While the QCM begins to measure the resonant frequency and delay time, the processor 155 outputs a start signal with high level through a GIOP pin for driving the first transistor 115 to be entered into the saturation status. The voltage Va of the node A is about 0.2 volts.

Because the Va is about 0.2 volts, the switch 121 will keep in the short circuit so as to transmit the signal of the input end of the switch 121 to the output end directly. Therefore, the quartz oscillator 122 can generate the original oscillating signal.

The amplitude hold circuit 140 receives the original oscillating signal for outputting a hold maximum oscillating signal. The processor 155 receives the hold maximum oscillating signal through a pin of analog-to-digital converter in a digital form, and the processor 155 can obtain the amplitude of the original oscillating signal.

While the switch circuit 110 receives the start signal, the switch circuit 110 will enable the transistor oscillating circuit 120 to generate the original oscillating signal, and then the processor 155 can record the time T1. While performing oscillating, the comparator 130 can generate an oscillating square wave to the frequency and oscillating start signal detecting circuit 151, and the processor 155 can record the time T2. While the amplitude of the hold maximum oscillating signal is greater than a predetermined value ($V_T$), the original oscillating signal generated by the quartz oscillator 122 is becoming stable. At this time, the processor 155 can record the time T3 for counting the delay time of the QCM through the T1 and T2.

Because the original oscillating signal generated by the quartz oscillator 122 is becoming stable, the processor 155 can enable the counter 152 to begin counting timing quantity so as to determine the relation between the resonant frequency and the amplitude signal of the QCM.

In view of the foregoing, it is known that the present invention can accurately measure the frequency of the oscillating signal for counting the variation of the resonant frequency so as to acquire the mass of the material cohered by the QCM. Further, this present invention can measure the delay time occurred before the amplitude and the frequency of the oscillating signal becomes stable for determining the mass and the adsorption quantity of the material detected by the QCM so as to solve the aforementioned question.

Although the present invention has been explained in relation to its preferred embodiment, it is to be understood that many other possible modifications and variations can be made without departing from the spirit and scope of the invention as hereinafter claimed.

What is claimed is:

1. A system for measuring resonant frequency and delay time of a quartz crystal microbalance, comprising:
   a transistor oscillating circuit, which has a quartz oscillator for generating an original oscillating signal;
   a switch circuit, which is coupled to the transistor oscillating circuit and receives a start signal for enabling the transistor oscillating circuit to generate the original oscillating signal;
   a comparator circuit, which is coupled to the transistor oscillating circuit for converting the original oscillating signal to a square wave oscillating signal; and
   a control circuit, which is coupled to the comparator circuit for receiving the square wave oscillating signal so as to determine the resonant frequency and the delay time of the quartz crystal microbalance.

2. The system as claimed in claim 1, further comprising:
   an amplitude hold circuit, which is coupled to the transistor oscillating circuit and the control circuit for receiving the original oscillating signal to output a hold maximum oscillating signal.

3. The system as claimed in claim 2, wherein the control circuit comprises:
   a frequency and oscillating start signal detecting circuit, which is coupled to the comparator circuit for receiving the square wave oscillating signal to estimate the resonant frequency of the quartz crystal microbalance so as to generate an oscillating start signal and a frequency value; and
   a processor, which is coupled to the frequency and oscillating start signal detecting circuit for determining the delay time of the quartz crystal microbalance based on the oscillating start signal.

4. The system as claimed in claim 3, wherein the frequency and oscillating start signal detecting circuit further comprises:
   a counter coupled to the comparator circuit for counting the square wave oscillating signal outputted by the comparator circuit to generate the frequency value.

5. The system as claimed in claim 4, wherein the frequency and oscillating start signal detecting circuit is implemented by a programmable logic element.

6. The system as claimed in claim 5, wherein the switch circuit is composed of a first resistor, a second resistor, and a first transistor.

7. The system as claimed in claim 6, wherein the first transistor is an NPN transistor.

8. The system as claimed in claim 7, wherein a base of the NPN transistor is coupled to the processor for receiving the start signal outputted by the processor.

9. The system as claimed in claim 8, wherein the start signal is a high level signal.

10. The system as claimed in claim 6, wherein the transistor oscillating circuit comprises a switch, a quartz oscillator, a first capacitor, a second capacitor, a third resistor, a fourth resistor and a second transistor.

11. The system as claimed in claim 10, wherein the second transistor is an NPN transistor.

12. The system as claimed in claim 11, wherein a control end of the switch is connected to a collector of the first transistor, an output end of the switch is connected to one end of the first capacitor, a base of the second transistor, and one end of the third resistor; one end of the quartz oscillator is connected to a input end of the switch, and the other end of the quartz oscillator is connected to a low voltage level; the other end of the first capacitor is connected to one end of the second capacitor, and the other end of the second capacitor is connected to a low voltage level; a collector of the second transistor is connected to the other end of the third resistor, and an emitter of the second transistor is connected to one end of the fourth resistor, and the other end of the fourth resistor is connected to a low voltage level.

13. The system as claimed in claim 12, wherein the comparator circuit comprises a third capacitor, a fifth resistor, and a first comparator.

14. The system as claimed in claim 13, wherein one end of the third capacitor is connected to one end of the first capacitor and the second capacitor, and the other end of the third capacitor is connected to a positive input end of the first comparator; one end of the fifth resistor is connected to a reference voltage and a negative input end of the first comparator, and the other end of the fifth resistor is connected to a positive input end of the first comparator.

15. The system as claimed in claim 14, wherein the reference voltage is 1.8 volts.

16. The system as claimed in claim 15, wherein the amplitude hold circuit comprises a fourth capacitor, a first diode, a second comparator, a second diode, a adjustable resistor and a fifth capacitor.

17. The system as claimed in claim 16, wherein one end of the fourth capacitor is connected to one end of the first capacitor and the second capacitor, and the other end of the fourth capacitor is connected to a positive input end of the second comparator; a negative end of the first diode is connected to a positive input end of the second comparator, and a positive end of the first diode is connected to a high voltage level; a positive end of the second diode is connected to an output end of the second comparator; one end of the fifth capacitor is connected to a negative end of the second diode, and the other end of the fifth capacitor is connected to a low voltage level; one end of the adjustable resistor is connected to the negative end of the second diode, and the other end of the adjustable resistor is connected to a low voltage level, and the mid end of the adjustable resistor is connected to a negative end of the second comparator, so as to make the amplitude hold circuit form as a voltage follower.

* * * * *